UNITED STATES PATENT OFFICE 2,301,246

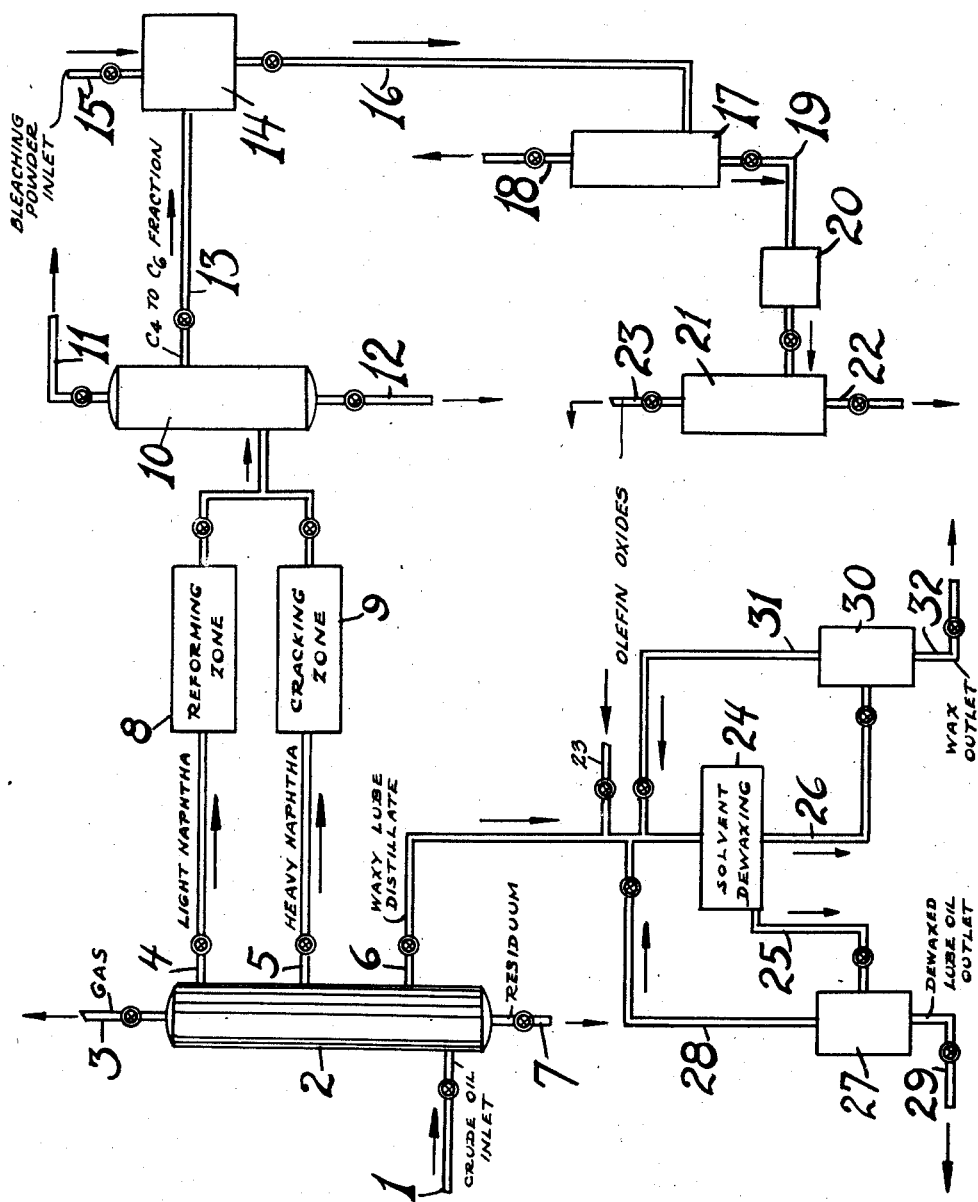

REFINING OF MINERAL OILS

Benjamin T. Brooks, Old Greenwich, Conn., and Frederick William Schumacher, Mountainside, N. J., assignors to Standard Oil Development Company, a corporation of Delaware Application August 24, 1940, Serial No. 354,018

8 Claims. (Cl. 196—18)

The present invention relates to the refining of mineral oils. The invention is more particularly concerned with an improved method for separating waxy constituents from wax-bearing oils in order to produce dewaxed oils of low cold test and is especially directed to utilization of an improved dewaxing solvent selected from the class of olefin oxides, characterized by having from four to six carbon atoms in the molecule.

It is well known in the art to separate waxy constituents from wax-bearing mineral oils by various methods, all of which have in common the feature of solidifying the waxy constituents by cooling or chilling the wax containing feed oil to relatively low temperatures. The separation of the solid precipitated waxy constituents from the chilled oil is then effected by allowing the precipitated wax to settle by gravity and the wax-free oil decanted, or by filtering the oil either in the usual plate or frame presses or drum filter, or by means of a centrifugal or equivalent filters. It is also known in the art to facilitate and accelerate the separation of the wax from the wax-bearing oil by utilizing various materials as dewaxing solvents and so-called settling or filtering aids. Dewaxing solvents conventionally used are selected from a wide variety of substances. For example, it is known to use various quantities of light naphthas, propane, heptane, hexane, pentane and the like, as well as various acetates, ketones and alcohols. An ideal solvent for employment in a dewaxing operation is one which has substantially no solubility for the waxy constituents at dewaxing temperatures and which has a very low miscibility temperature with the wax-free oil. It is also desirable that the solvent permit relatively high filtering rates at low temperatures, in order to secure an economical commercial operation with respect to the capacity of the filtration equipment. A suitable solvent, furthermore, must be a substance which is easily separable and recoverable from the dewaxed oil. Very few solvents or solvent mixtures possess all these characteristics to the desired degree.

We have, however, now discovered a class of substances which when utilized in operations for the removal of waxy constituents from wax-bearing oils produce unexpected desirable results. Our solvents are selected from the class of olefin oxides which are characterized by having a structural formula containing the following linkage:

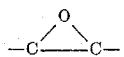

and which are further characterized by having from four to six carbon atoms in the molecule. Solvents of this character are, for example, isobutene oxide or butene oxide and the pentene oxides. The preferred solvents of our invention are selected from the class of olefin oxides which contain five or six carbon atoms in the molecule. A particularly desirable solvent comprises a mixture of both the straight and branched chained pentene oxides.

One of the major factors influencing the suitability and adaptability of a material for use as a dewaxing solvent is its relative solubility for the waxy constituents and for the low pour point oily fractions. As previously stated, the ideal dewaxing solvent is one that will show a relatively low solubility for the waxy constituents, will exhibit a relatively high solubility for the oily fractions and which will also remain completely miscible with the oily constituents at the relatively low temperatures necessarily employed in dewaxing operations. Low wax solubility is desired since this factor determines the temperature degree spread between the temperature at which the dewaxing operation is carried out, and the pour point of the dewaxed oil. Complete miscibility between the solvent and the oil constituents is necessary in order to secure a satisfactory separation of the wax crystals from the dewaxing solution.

The desirability of the present class of dewaxing solvents may be seen by reference to the following data, listing wax solubility and miscibility temperatures for various substances.

| Solvent | Approx. boiling range °F | Wax soulbility temp. 40° F.[1] | Oil miscibility. temp.[2] |
|---|---|---|---|
| | | | °F. |
| Isobutene oxide | 123–152 | 0.021 | +32 |
| Pentene-2 oxide | 173–184 | 0.052 | −34 |
| Mixed pentene oxides | 164–184 | 0.029 | −22 |
| N-hexene oxide | 218–231 | 0.056 | −70 |
| Methyl n-butyl ketone | 259–264 | 0.023 | +2 |
| 50% benzol–50% methyl ethyl ketone | 175–180 | 0.031 | +11 |
| 75% ethylene dichloride–25% carbon tetrachloride | 171–183 | 0.061 | +2 |

[1] Grams 140° F. M. P. wax/100 cc. solvent.
[2] Miscibility temperature 3:1 dilution with a petroleum oil having a 26.5 A. P. I., gravity, a color Robinson of 2, a pour of 10° F., a viscosity of 152 Saybolt seconds at 210° and a viscosity index of 102.

From the above data it is apparent that mixed pentene oxides have a wax solubility approximately equal to that of methyl normal butyl ketone, or the 50/50 blend of benzol and methyl ethyl ketone, while the oil solubility as indicated by the oil miscibility temperature is substantially better. Normal hexene oxides have a lower wax solubility than the 75/25 blend of ethylene dichloride and carbon tetrachloride, and at the same time have a very much better oil solubility as measured by miscibility temperatures. It is thus apparent that by blending the various olefin oxides containing four to six carbon atoms in the molecule it is possible to obtain a wide range of wax and oil solubilities and thus arrive at whatever solvency condition is optimum for the particular stock being processed. In general the wax solubility increases with increasing molecular weights and increasing boiling points of the oxides, and we have found that olefin oxides containing more than six carbon atoms in the molecule are not satisfactory as diluents for dewaxing petroleum oils. Furthermore, olefin oxides containing lower than four carbon atoms do not have sufficient oil solubility to be satisfactorily employed in a dewaxing operation without the use of other solvents to increase oil solubility.

The process of the present invention may be widely varied. The solubility of commercial paraffin wax in the two butene oxides derived from isobutene and butene-2 is substantially the same although both have a lower solubility for paraffin wax than the pentene oxides. Accordingly, it is preferred to use the mixtures of butenes, pentenes, and hexenes formed by petroleum cracking processes in the manufacture of olefin oxides, rather than oxides made from pure individual butenes, pentenes and hexenes.

The olefin oxide may be prepared or secured in any desirable manner. One method of preparing these compounds is to react the olefin with bleaching powder comprising calcium chloride and calcium hypochlorite under conditions to attach the hydroxyl group and chlorine to the alkyl chain. This compound is then steamed with calcium hydroxide to form the corresponding olefin oxide. Another method of securing desirable olefin oxides is to treat a relatively low-boiling petroleum oil fraction in a manner to segregate the olefin from the saturated compound. This is preferably accomplished by means of various selective solvents. The segregated olefins are then treated in the above described manner to form the corresponding olefin oxides.

It is also possible to prepare the olefin oxides from a mixture comprising butane to hexane paraffins and olefins by treating the mixture with bleaching powder and then distilling the unreacted paraffins from the chlorhydrins formed by the reaction of the bleaching powder with the olefins.

A desirable modification and adaptation of the present invention is to process a crude oil or similar feed oil in a manner to segregate a waxy fraction and a four to six carbon atom olefin-containing fraction. The olefin-containing fraction is then prepared by subjecting the naphtha, kerosene and gas oil to cracking conditions and treating to form the corresponding olefin oxides from the olefins. The olefin oxides are segregated by suitable means, usually by distillation, then mixed with the waxy fraction which is subsequently processed in a conventional dewaxing operation for the removal of the waxy constituents. The olefin oxides are removed from the dewaxed oil and preferably recycled to the system while the dewaxed oil is further processed or handled in any manner desirable.

This adaptation of the present invention may be readily understood by reference to the attached drawing illustrating one modification of the same. For purposes of illustration it is assumed that the feed oil comprises a crude oil containing waxy lubricating oil constituents and relatively low-boiling constituents having from four to six carbon atoms in the molecule. The feed oil is introduced into distillation zone 2 by means of feed line 1. It is to be understood that the distillation zone 2 may comprise any desirable number and arrangement of distillation units. Temperature and pressure conditions are adjusted to remove overhead by means of line 3, relatively low-boiling normally gaseous hydrocarbon constituents, to remove by means of line 4 a hydrocarbon fraction boiling in the light naphtha boiling range and to remove by means of line 5 a petroleum oil fraction boiling in the heavy naphtha and gas oil boiling range. A waxy lubricating oil fraction is removed by means of line 6 while relatively higher-boiling constituents are removed by means of line 7. The light naphtha fraction is passed to reforming zone 8 while the heavy naphtha and gas oil fraction is passed to cracking zone 9. Temperature and pressure conditions are adjusted in the respective zones to produce products comprising olefins which are passed to distillation zone 10. The lower boiling constituents are removed overhead by means of line 11, while the relatively higher boiling fractions are removed as a bottoms by means of line 12. The fractions comprising hydrocarbon constituents containing from four to six carbon atoms in the molecule is withdrawn by means of line 13 and introduced into zone 14 wherein the fraction is treated in a manner to convert the olefins into the corresponding olefin oxides. This may be accomplished by any suitable method, preferably by the one described above in which bleaching powder is introduced by means of line 15. This fraction containing desirable olefin oxides is withdrawn from zone 14 by means of line 16 and passed into distillation zone 17. Temperature and pressure conditions are adjusted to remove overhead saturated hydrocarbon constituents by means of line 18 and to remove as a bottoms product by means of line 19, the olefin as chlorhydrins. These constituents are then passed to zone 20 and contacted with milk of lime, then passed to distillation unit 21. Calcium chloride is removed by means of line 22 while the olefin oxides are removed overhead by means of line 23. The olefin oxides are mixed with the waxy lubricating oil fractions withdrawn by means of line 6, and the mixture passed to dewaxing zone 24, in which operating conditions are adjusted to produce a substantially wax-free oil which is withdrawn by means of line 25, and a waxy fraction which is withdrawn by means of line 26. The dewaxed oil fraction is introduced into separation unit 27, in which temperature and pressure conditions are adjusted to remove overhead by means of line 28, the dewaxing solvents and to remove by means of line 29 a wax and solvent-free lubricating oil fraction. This fraction may be further processed or handled in any manner desirable. The waxy constituents are passed to separation zone 30 in which temperature and pressure conditions are adjusted to remove overhead by means of line 31 the olefin oxides and to remove by means of line 32 the solvent free waxy constituents.

These solvents may be employed in dewaxing operations for the removal of waxy constituents from any mineral oil, but are particularly adapted for the removal of waxy constituents from petroleum oils. They are suitable for dewaxing operations conducted over a wide range of temperature and pressure conditions. However, in general the dewaxing operations employing the olefin oxides of the present invention are entirely similar to the conventional dewaxing operations now currently employed. In these operations the solvent is added to the waxy oil and the mixture heated to assure complete miscibility of all wax and oil fractions in the solvent. The mixture is then chilled to a temperature in the range between about +30° F. and −30° F. depending upon the character of the crystallized wax to be removed and the pour point desired in the dewaxed oil. The crystallized wax is removed either by filtration or by centrifuging while the solvent is removed from the separated wax constituents and from the dewaxed oil fractions by distillation.

The amount of dewaxing solvent employed likewise may vary widely depending upon the particular oil being dewaxed, the solvent employed, and the character of the dewaxed oil desired. In general it is preferred to employ from 1 to 4 volumes of dewaxing solvent per volume of oil being dewaxed.

Under certain conditions the solvents of the present invention may be employed in conjunction with various other conventional dewaxing solvents such as ketones, chlorinated solvents, naphtha and the like. A particularly desirable solvent mixture comprises a solvent selected from the dewaxing solvents of the present invention and methyl ethyl ketone, a related ketone.

The suitability of the substances of the present invention for use as dewaxing solvents may be readily seen by reference to the following data showing the limited wax solubility in various solvents at various temperatures.

*Solubility of 140° F. M. P. finished refined wax*

| Isobutene oxide | | Pentene oxides | | n-Hexene oxide | |
| --- | --- | --- | --- | --- | --- |
| G. wax/ 100 cc. | Temp. °F. | G. wax/ 100 cc. | Temp. °F. | G. wax/ 100 cc. | Temp. °F. |
| 0.059 | 53 | 0.0515 | 46 | 0.0515 | 39 |
| 0.26 | 74 | 0.22 | 62 | 0.208 | 54 |
| 0.645 | 84 | 0.627 | 73 | 0.605 | 66 |

Miscibility temperatures were also determined on various solvents and solvent mixtures with the following results:

*Various solvent oil miscibility temperatures when using an oil having a viscosity Saybolt of 210° F. of 160 seconds, a pour of 5° F., and a viscosity index of 100*

(Three volumes of solvent employed per volume of oil)

| Solvent | Methyl ethyl ketone in solvent | Miscibility temp. |
| --- | --- | --- |
|  | Per cent | °F. |
| Methyl ethyl ketone | 100 | 112 |
| Isobutene oxide | 33.3 | 59 |
| Do | 50.0 | 72 |
| Do | 66.7 | 85 |
| Pentene oxides | 33.3 | 22.5 |
| Do | 50.0 | 46 |
| Do | 66.7 | 67 |
| n-Hexene oxide | 33.3 | −1 |
| Do | 50.0 | 21 |
| Do | 66.7 | 52 |
| Do | 80.0 | 77 |
| Pentene-2 oxide | 66.7 | 61 |
| Do | 80 | 81 |
| Benzol | 66.7 | 45 |
| Do | 80 | 70 |
| Methyl n-butyl ketone | 33.3 | 33.5 |
| Do | 50.0 | 53.5 |
| Do | 66.7 | 77 |

From the above it is apparent that the dewaxing solvents of the present invention possess considerable merit over those solvents now conventionally employed.

The process of the present invention is not to be limited by any theory or mode of operation but only by the following claims in which it is desired to claim all novelty in so far as the prior art permits.

We claim:

1. Process for the removal of waxy constituents from a feed oil containing the same which comprises mixing with the feed oil a quantity of an olefin oxide characterized by having from four to six carbon atoms in the molecule, chilling the mixture to a temperature at which the waxy constituents precipitate, separating the precipitated waxy constituents from the dewaxed oil, and removing the olefin oxide therefrom.

2. Process in accordance with claim 1 in which said olefin oxide is selected from the class of substances containing from five to six carbon atoms in the molecule.

3. Improved process for the removal of waxy constituents from petroleum oils containing the same which comprises mixing with the feed petroleum oil a dewaxing solvent selected from the class of olefin oxides characterized by containing from four to six carbon atoms in the molecule, heating the mixture to secure substantially complete miscibility, cooling the mixture to a temperature at which the waxy constituents precipitate, separating the waxy constituents from the dewaxed oil and removing the solvent therefrom.

4. Process in accordance with claim 3 in which said solvent comprises a pentene oxide.

5. Process in accordance with claim 3 in which said solvent comprises a mixture of straight and branched chain olefin oxides containing from four to six carbon atoms in the molecule.

6. Process in accordance with claim 3 in which said solvent comprises a hexene oxide.

7. Process in accordance with claim 3 in which said solvent comprises a mixture of olefin oxides.

8. Process for the removal of waxy constituents from a feed oil containing the same which comprises mixing with the feed oil a dewaxing solvent comprising an olefin oxide characterized by having four to six carbon atoms in the molecule and another solvent, chilling the mixture to a temperature at which the waxy mixtures precipitate, separating the precipitated wax constituents from the dewaxed oil and removing the olefin oxide therefrom.

BENJAMIN T. BROOKS.
F. WILLIAM SCHUMACHER.